United States Patent [19]

Tanaka

[11] Patent Number: 4,928,298
[45] Date of Patent: May 22, 1990

[54] INFORMATION-BEARING SHEET FOR X-RAY FILM

[75] Inventor: Hiroyuki Tanaka, Kanagawa, Japan
[73] Assignee: NIX Company, Ltd., Tokyo, Japan
[21] Appl. No.: 760,554
[22] Filed: Jul. 30, 1985
[30] Foreign Application Priority Data Aug. 7, 1984 [JP] Japan ................................ 59-120630

[51] Int. Cl.$^5$ ............................................ H05G 1/28
[52] U.S. Cl. ..................................... 378/162; 378/165
[58] Field of Search ................................. 378/162, 165

[56] References Cited

U.S. PATENT DOCUMENTS 2,426,286  8/1947  Stadler ................................ 378/165
3,917,952  11/1975  Jackson ............................... 378/165

FOREIGN PATENT DOCUMENTS 0447301  5/1936  United Kingdom ................ 378/165

Primary Examiner—Janice A. Howell
Assistant Examiner—David P. Porta
Attorney, Agent, or Firm—Wegner & Bretschneider

[57] ABSTRACT

The specification describes an information-bearing sheet suitable for use with an X-ray film. The sheet is formed of a mark-bearing portion, which is to be applied to the X-ray film and exposed to X-ray upon taking an X-ray picture of an object, and a data-filling portion bearing, in a form printed thereon, the same mark as the mark-bearing portion, containing at least one blank space adapted to fill identification data of the object and provided in combination with the mark-bearing portion. The mark may be printed with a lead-containing ink on the mark-bearing portion. When the X-ray film is exposed to X-ray with the mark-bearing portion applied thereon, the mark is automatically imprinted on the X-ray film. When taking the X-ray picture, the data-filling portion is filled with appropriate data on the object and is applied to a bag for storing or filing the X-ray picture. In this manner, the X-ray picture can be easily matched with its corresponding object without failure.

13 Claims, 4 Drawing Sheets

INFORMATION-BEARING SHEET FOR X-RAY FILM

BACKGROUND OF THE INVENTION (1) Field of the Invention

This invention relates to an information-bearing sheet suitable for use with an X-ray film in order to apply the information, especially, an identification mark to the X-ray film upon taking an X-ray picture.

(2) Description of the Prior Art

X-ray photography has found wide-spread utility in a variety of fields such as engineering, medicine, dentistry, etc. When taking a dental X-ray picture for example, an X-ray film is provided in an envelope which permits transmission of X-rays therethrough but does not permit transmission of light therethrough. After taking an X-ray picture of a tooth, teeth or a dentition on the X-ray film while still holding the X-ray film within the envelope, a developer and a fixer are successively injected into the envelope so as to subject the thus-exposed X-ray film to developing and fixing treatments. The thus-treated X-ray film is taken out of the envelope to obtain an X-ray picture of the tooth, teeth or dentition, which is then used for diagnosis. In such X-ray photography, it is essential to make the thus-taken X-ray film correspond exactly to the particular patient. For this purpose, it is commonly practiced to take the picture of a mark, which is adapted to identify each patient, on his X-ray film upon taking his dental X-ray picture.

FIG. 1 is a plan view of an pack of X-ray film. In the drawing, numeral 1 indicates the pack of X-ray film. Designated at numeral 2 is an envelope which is made of such an opaque material that permits transmission of X-ray therethrough but shuts out light. Numeral 3 indicates an X-ray film enclosed hermetically in the envelope 2. The drawing also shows a mark-bearing portion 4 adhered on the envelope 2 at a suitable location (for example, in one of its corners) and a mark 5 (the numeral "1" is shown by way of example) printed on the mark-bearing portion 4. The mark 5 has been printed on the mark-bearing portion 4, for example, with a lead-containing ink.

Prior to taking the X-ray picture, a mark which is the same as the mark 5 adhered on the X-ray film pack and the name of the patient are beforehand written in a dental chart or the like. Subsequent to the above-described preparation, an X-ray picture may be taken in such a manner as will be described next. First of all, the X-ray film pack 1 is inserted between the tongue of the patient and the dentition containing a target tooth with the side having the mark-bearing portion 4 adhered thereon being directed toward the target tooth and is then brought, from the tongue side of the patient, into contact with the target tooth. X-rays is thereafter irradiated to the target tooth from the side opposite to the X-ray film pack 1. After completion of the irradiation of X-ray, the thus-exposed X-ray film pack 1 is taken out of his mouth and a developer and a fixer are successively injected by means of a syringe or the like into the X-ray film pack 1. After completion of its developing and fixing, the envelope 2 is opened to take out the X-ray film 3 from the envelope 2. An X-ray picture similar to that illustrated in FIG. 2, which is a plan view of an exposed X-ray film, is obtained on the thus taken-out X-ray film 3 in the above-described manner.

Referring now to FIG. 2, there are shown the X-ray film 3, an X-ray picture 6 of teeth and an X-ray picture 5' of the mark 5 depicted in FIG. 1. Since the X-ray picture 5' of the specific mark is obtained on the exposed X-ray film 3 in the above manner, it is possible to identify the patient of the X-ray film 3 without failure. The X-ray picture 5' may hereinafter be referred to as "the mark 5'" for the sake of brevity.

By the way, the thus-exposed X-ray film must be stored in a certain way because it will be used for subsequent treatment, diagnosis and/or the like. If it is stored or filed as is, it is impossible to identify the patient of the X-ray film because it bears the X-ray picture 5' of the mark "1" only. When storing or filing such an X-ray film, it must be necessary to make it possible to know the name of the patient of the X-ray film by some means. For this purpose, it has conventionally been practiced to place the X-ray film in a bag or the like and then to write the patient's name corresponding to the mark 5' on the X-ray film with reference to the corresponding dental chart which was filled out prior to taking the X-ray picture.

The above-described method is however extremely irksome, because a mark must be written in a dental chart and another mark, which is the same as the first-mentioned mark, and its corresponding patient's name must also be written on a bag adapted to store or file the X-ray film. Moreover, the above-mentioned method is also accompanied by a danger that when writing the patient's name on the storing or filing bag of the X-ray film, another patient's name may be erroneously written there unless special care is exercised. This type of problem is not limited to dental X-ray photography but is a problem liable to occur routinely in other X-ray photography such as medical and industrial X-ray photography.

SUMMARY OF THE INVENTION

With the foregoing in view, the present invention has as its object the provision of an information-bearing sheet suitable for use with an X-ray film, which sheet is free of the above-described problems of the prior art and permits fail-free and easy matching between the resulting exposed X-ray film and its corresponding object, for example, patient.

In one aspect of this invention, there is thus provided an information-bearing sheet suitable for use with an X-ray film, which comprises:

a mark-bearing portion to be applied to the X-ray film and exposed to X-rays upon taking an X-ray picture of an object on the X-ray film; and a data-filling portion bearing, in a form printed thereon, the same mark as the mark-bearing portion, containing at least one blank space adapted to fill identification data of the object therein and provided in combination with the mark-bearing portion.

Owing to the combined provision of the mark-bearing portion and data-filling portion as the information-bearing sheet, it is possible to easily match each exposed X-ray film with its corresponding object without failure.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 3:
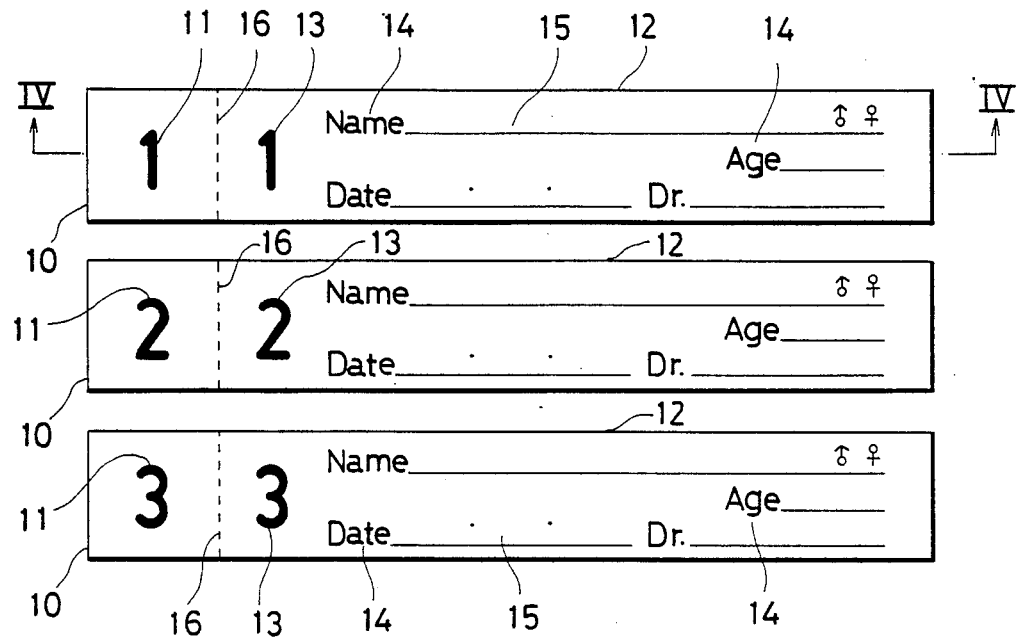
FIG. 3 is a plan view of an information-bearing sheet according to one embodiment of this invention, which is suitable for use with an X-ray film.
Figure 4:
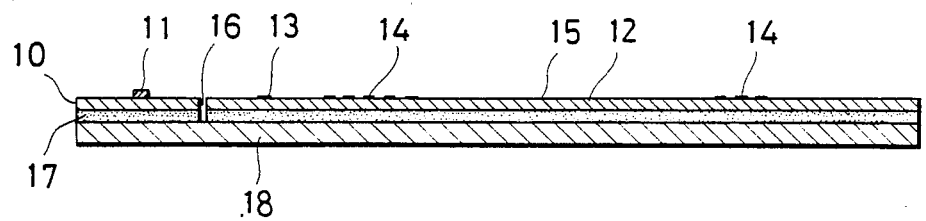
FIG. 4 is a cross-sectional view taken along line IV—IV of FIG. 3.

Referring first to FIGS. 3 and 4, there are illustrated a marker 10 made of paper or a synthetic resin, said marker 10 being adhered on an X-ray film pack and exposed to X-ray upon its application, and a mark 11 printed on the marker 10. In the illustrated embodiment, the mark 11 is a numeral "1". Needless to say, the mark 11 may take a variety of numbers besides the above numeral "1", for example, "2", "3", . . The mark 11 is printed using an X-ray impervious material, e.g., a lead-containing ink. Numeral 12 indicates a data sticker made, for example, of the same paper or synthetic resin as the paper or synthetic resin which makes up the marker 10. The data sticker 12 is employed to put down some data thereon. Designated at numeral 13 is an identification mark printed on the data sticker 12. The identification mark 13 has been placed there by printing the same mark as the mark 11, which has been printed on the corresponding marker 10, with a usual ink. Numeral 14 indicates desired data items which include patient's name, sex and age, date, doctor's name. If desired or necessary, it is possible to include other data items such as region. These data items 14 have been printed on the data sticker 12, using the same usual ink as the mark 13. Numeral 15 indicates blank spaces corresponding to these data items 14. Designated at numeral 16 is a tear line consisting of suitable tear-facilitating means such as perforations formed in a straight row. Owing to the provision of the tear line 16, the marker 10 and data sticker 12 can be easily torn off from each other. Numeral 17 indicates an adhesive layer coated on both marker 10 and data sticker 12, while numeral 18 indicates a sheet of release paper.

Figure 1:
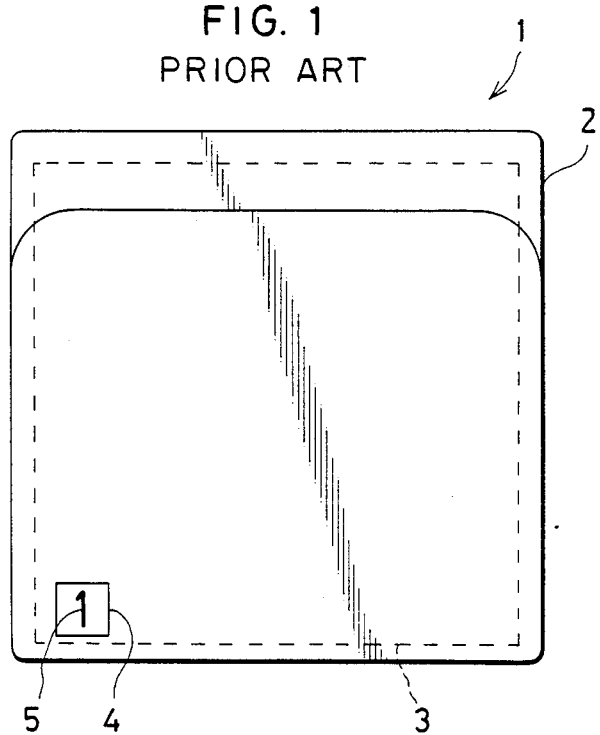
FIG. 1 is a plan view of an X-ray film pack.
Figure 2:
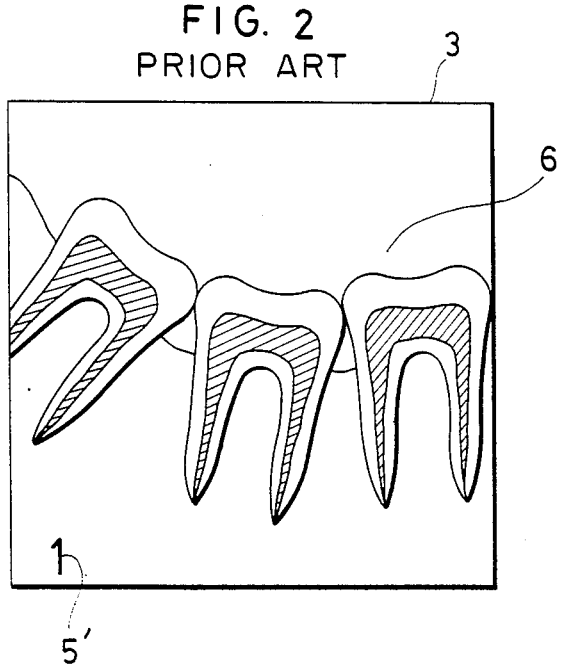
FIG. 2 is a plan view of an X-ray film on which a dental X-ray picture has been taken.

When taking an X-ray picture, the operator fills out the blank space 15 of the data sticker 12. Then, the marker 10 is torn off and is affixed by means of the adhesive layer 17 to a suitable area of the X-ray film pack 1 to be used for the photography. X-ray photography is thereafter effected and upon application of developing and fixing treatments, an X-ray film is obtained with an X-ray picture of the mark (for example, the numeral "1") printed on the marker 10. An X-ray film obtained in the above-described manner is shown in plan in FIG. 5, in which numeral 11' indicates an X-ray picture of the mark 11 on the marker 10. Incidentally, numeral 6 indicates an X-ray picture of teeth, which is the same as that identified by the same numeral in FIG. 2.

When storing or filing the above-obtained X-ray film, it is only necessary to peel off the data sticker 12, which bears the same identification mark 13 as the mark 11' imprinted on the X-ray film, from the release paper 18 and then to adhere it to a storing or filing bag. It is thus unnecessary to write the mark on the storing or filing bag. The blank spaces 15 of the data sticker 12 can be filled out at the same time as the corresponding dental chart is written. Moreover, it is only required to match the mark 11' imprinted on the X-ray film with the identification mark 13. It is thus feasible to achieve easy matching between the X-ray film and the corresponding data without failure.

Figures 5, 6:
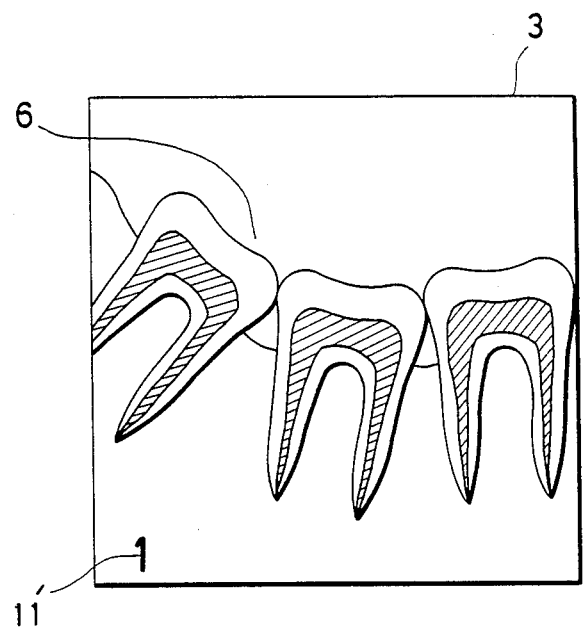
FIG. 5 is a plan view of an X-ray film on which a dental X-ray picture has been taken using the mark depicted in FIGS. 3 and 4.
FIG. 6 is a plan view of an information-bearing sheet according to another embodiment of this invention, which is also suitable for use with an X-ray film.

Referring next to FIG. 6, the like elements of structure as those illustrated in FIGS. 3 and 4 are identified by like reference numerals. The present embodiment is different from the embodiment shown in FIG. 3 only in that the mark 11 is printed with a mirror image configuration, the marker 10 and data sticker 12 have already been separated, and several sets of markers 10 and data stickers 12 are adhered on a single sheet of release paper 18. The other features are identical to the corresponding features of the embodiment depicted in FIG. 3.

Figures 7, 8:
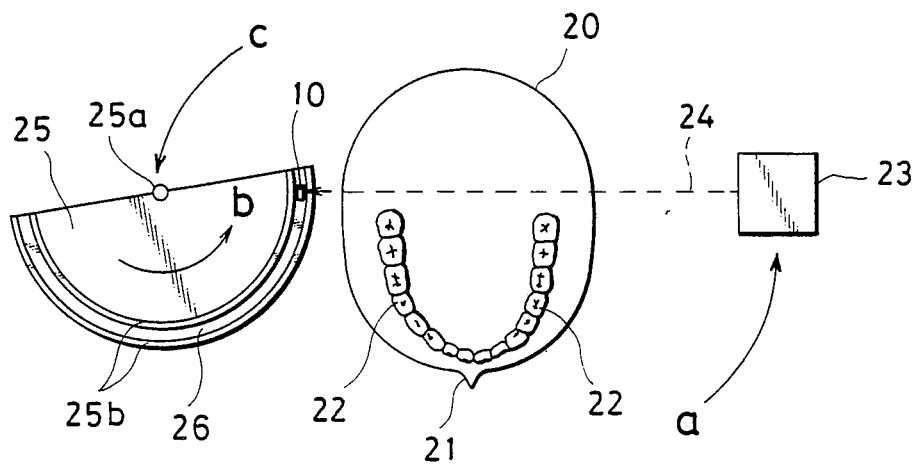
FIG. 7 schematically illustrates panoramic radiography making use of the information-bearing sheet depicted in FIG. 6.
FIG. 8 is a plan view of an information-bearing sheet according to a further embodiment of this invention, which is also suitable for use with an X-ray film.

The reasons for the formation of the mark 11 in the mirror image configuration will next be described with reference to FIG. 7. When taking a dental X-ray picture, panoramic radiography is in some instances employed to take an X-ray picture of not only a specific region (for example, a diseased part) and its adjacent areas but also all the remaining teeth on a single sheet of X-ray film. Panoramic radiography is now described with reference to FIG. 7, in which there are shown the head 20 of an adult patient, his nose 21 and his lower dentition 22. Numeral 23 indicates an X-ray irradiation apparatus while numeral 24 designates X-rays given off from the X-ray irradiation apparatus 23. There are also depicted a semicircular film support 25 adapted to hold an X-ray film for panoramic radiography, a central axis 25a of the film support 25, X-ray film mounting frames 25b provided along the arcuate circumferential edge of the film support 25, and an X-ray film cassette 26 mounted on the film support 25 by means of the frames 25b. The X-ray film cassette 26 is composed of a casing, which permits the transmission of X-rays therethrough but shuts off light, an X-ray film and an intensifying screen. The X-ray film and intensifying screen are both enclosed within the casing. Since panoramic radiography is intended to obtain an X-ray picture of all the teeth of a dentition in a pattern developed laterally, the X-ray film and the X-ray film cassette 26, which encloses the X-ray film, are of elongated shapes. The marker 10, which has been peeled off from the information-bearing sheet, is adhered on the X-ray film cassette 26 at a location adjacent to one end thereof.

Panoramic radiography is practiced in the following manner. First of all, the X-rays 24 are irradiated from the X-ray irradiation apparatus 23 in the radiography-starting position depicted in FIG. 7. The X-rays 24 are allowed to advance right onto the marker 10, thereby exposing the marker 10 to the X-ray 24. After that, the X-rays 24 are continuously radiated from the X-ray irradiation apparatus 23. At the same time, the X-ray irradiation apparatus 23 begins to rotate in a direction indicated by an arrow a while the film support 25 starts rotating in a direction indicated by an arrow c and the film support 25 per se starts rotating about the central axis 25a in a direction indicated by an arrow b.

The X-rays 24 pass through two teeth, one being on the side of the X-ray irradiation apparatus 23 and the other on the side of the film support 25. However, the latter tooth which is closer to the X-ray film is solely taken on the X-ray film, and the other tooth which is more remote from the X-ray film is not taken on the X-ray film because its image is not focused on the X-ray film due to the rather longer distance between the other tooth and the X-ray film. Accordingly, the resultant X-ray picture of the dentition is considered as if it has been taken with an X-ray source disposed within the mouth (at a location corresponding to his tongue).

When the X-ray irradiation apparatus 23 and film support 25 have continued their rotation in the directions indicated by their respective arrows over 180 degree about the head 20, the relative positional relationship between the X-ray irradiation apparatus 23 and film support 25 has been rendered opposite to that at the beginning of the panoramic radiography. Furthermore, the film support 25 has also rotated by itself approximately over 180 degree about the central axis 25a in the direction indicated by the arrow b. Owing to this rotation, all the teeth of the dentition can be taken on the single sheet of X-ray film. When analyzing the thus-taken dental X-ray film in comparison with the corresponding dentition of the patient, it is apparent that the observer sees the X-ray film from the side facing the central axis 25a as viewed in FIG. 7 so as to make the position of the X-ray film match the actual dentition. Therefore, the mark 11 imprinted on the X-ray film is also seen from the same side. By printing the mark 11 in a mirror image configuration for panoramic radiography, the mark 11 can be seen in its normal image configuration when the resultant dental X-ray film is observed.

The information-bearing sheet according to the further embodiment of this invention is now described with reference to FIG. 8, in which like elements of structure as those depicted in FIGS. 3, 4 and 6 are identified by like reference numerals. Numerals 31,32 indicate boxes in which unit marks are respectively written. These boxes will next be described.

As more X-ray pictures are taken and more X-ray films are used, more information-bearing sheets are correspondingly employed. This means that a number of different marks are required. X-ray pictures with such different marks have to be filed, for example, in the chronological or alphabetical order. This is certainly somewhat cumbersome work.

By the way, dental X-ray films are generally sold in cases each of which contains, for example, 100 X-ray films as a set. In this embodiment, each of such cases is applied with a mark consisting of one or two letters of the Roman alphabet. For example, a mark "AB" is allotted to a particular case. With respect to all the 100 dental X-ray films contained in the case, the mark "AB" are printed in advance on their respective envelopes with an X-ray impervious material.

On the other hand, the radiographer prepares in advance a plural set of information-bearing sheets which are of the same type as that in FIGS. 3 or 6 and are numbered respectively from "1" to "100". If he obtains cases having different unit marks, he can still use the numbers ranging from "1" to "100" repeatedly for the X-ray films in the different cases. Let's assume by way of example that he has bought five cases of different unit marks, say, "A", "AA", "AB", "AC" and "AD". If the numbers ranging from "1" to "100" are allotted respectively to the individual X-ray films in each of the cases, it is only necessary for him to keep 5 sets of information-bearing sheets numbered respectively from "1" to "100" for the 500 X-ray films in total. It is thus unnecessary for him to keep information-bearing sheets numbered respectively from "101" to "500".

In actual application, it is necessary to put down the unit mark of each X-ray film, which is to be used, in the boxes 31,32 upon taking an X-ray picture with the X-ray film. In this manner, it is possible to make a significant reduction to the size of numbers required for individual information-bearing sheets.

In the above-described embodiments, the respective information-bearing sheets were used by way of example for dental applications. The application field of such information-bearing sheets is however not limited to dentistry but may be equally expanded to other areas such as medicine and engineering. The storing or filing bags were referred to as means for storing or filing X-ray films. This invention can however be applied irrespective of the type of such storing or filing means. The individual marks are not necessarily limited to numbers or letters but other symbols may also be used as such marks. Since the marks printed on the markers contain lead, they may be covered with transparent films to avoid any adverse effects of the lead, which is contained in the marks, to human bodies. Use of such transparent films is particularly effective for dental X-ray film packs, because the X-ray packs are inserted in mouths together with their respective lead-containing markers adhered thereon.

Having now fully described the invention, it will be apparent to one of ordinary skill in the art that many changes and modifications can be made thereto without departing from the spirit or scope of the invention as set forth herein.

What is claimed is:

1. An information-bearing sheet suitable for use with an X-ray film in order to avoid confusion between X-ray pictures of different objects, comprising:
    a mark-bearing portion which is opaque to X-rays to be applied to the X-ray film and exposed to X-rays upon taking an X-ray picture of an object on the X-ray film; and
    a data-filling portion bearing, in a form printed thereon, the same mark as the mark-bearing portion, containing at least one blank space for filling out identification data of the object therein and provided in combination with the mark-bearing portion;
    wherein the mark-bearing portion and data-filling portion have adhesive layers on the back sides thereof and the information-bearing sheet further comprises a releasable base sheet on which the mark-bearing portion and data filling are releasably affixed; and
    the mark-bearing portion and data-filling portion are formed of a single piece of paper with a tear line, thereby permitting separation of the single piece of paper along the tear line into the mark-bearing portion and data-filling portion upon application of the information-bearing sheet.

2. An information-bearing sheet as claimed in claim 1, wherein the mark has been printed with a lead-containing ink on the mark-bearing portion.

3. An information-bearing sheet as claimed in claim 1, wherein the mark of the mark-bearing portion has mirror image configurations.

4. An information-bearing sheet as claimed in claim 1, wherein the object of a patient and the blank space is adapted to fill his name therein.

5. An information-bearing sheet as claimed in claim 1, wherein when a plurality of X-ray films are provided as a single unit and a mark indicating specifically the single unit is applied to each of the plurality of X-ray films, the data-filling portion further contains a section bearing the same unit identification mark.

6. An information-bearing sheet as claimed in claim 2, wherein the mark of the mark-bearing portion is covered with a transparent film.

7. An information-bearing sheet as claimed in claim 1, wherein said mark portion is to be applied to a dental X-ray film pack.

8. An information-bearing sheet suitable for use with an X-ray film in order to avoid confusion between X-ray pictures of different objects, comprising:
   a mark-bearing portion which is opaque to X-rays to be applied to the X-ray film and exposed to X-rays upon taking an X-ray picture of an object on the X-ray film; and
   a data-filling portion bearing, in a form printed thereon, the same mark as the mark-bearing portion, containing at least one blank space for filling out identification data of the object therein and provided in combination with the mark-bearing portion;
   wherein the mark-bearing portion and data-filling portion have adhesive layers on the back sides thereof and the information-bearing sheet further comprises a releasable base sheet on which the mark-bearing portion and data filling portion are releasably affixed;
   wherein the mark-bearing portion and data filling portion are respectively formed of separate pieces of paper; and
   wherein the mark has been printed with a lead-containing ink on the mark-bearing portion.

9. An information-bearing sheet as claimed in claim 8, wherein the mark of the mark-bearing portion is covered with a transparent film.

10. An information-bearing sheet as claimed in claim 8, wherein the object is a patient and the blank space is adapted to contain his name therein.

11. An information-bearing sheet as claimed in claim 8, wherein when a plurality of X-ray films are provided as a single unit and a mark indicating specifically the single unit is applied to each of the plurality of X-ray films, the data-filling portion further contains a section bearing the same unit identification mark.

12. An information-bearing sheet as claimed in claim 8, wherein said mark-bearing portion is to be applied to a dental X-ray film pack.

13. An information-bearing sheet suitable for use with an X-ray film in order to avoid confusion between X-ray pictures of different objects, comprising:
   a mark-bearing portion which is opaque to X-rays to be applied to the X-ray film and exposed to X-rays upon taking an X-ray picture of an object on the X-ray film; and
   a data-filling portion bearing, in a form printed thereon, the same mark as the mark-bearing portion, containing at least one blank space for filling out identification data of the object therein and provided in combination with the mark-bearing portion;
   wherein the mark-bearing portion and data-filling portion having adhesive layers on the back sides thereof and the information-bearing sheet further comprises a releasable base sheet on which the mark-bearing portion and data-filling portion are releasably affixed;
   wherein the mark-bearing portion and data filling portion are respectively formed of separate pieces of paper; and
   wherein the mark of the mark-bearing portion has mirror image configuration.

* * * * *